(12) United States Patent
Andris

(10) Patent No.: US 12,344,312 B2
(45) Date of Patent: Jul. 1, 2025

(54) COOLING SYSTEM FOR ELECTRICAL SYSTEMS FOR WORK MACHINES

(71) Applicant: Caterpillar Inc., Peoria, IL (US)

(72) Inventor: Eric Matthew Andris, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 292 days.

(21) Appl. No.: 18/184,731

(22) Filed: Mar. 16, 2023

(65) Prior Publication Data

US 2024/0308592 A1 Sep. 19, 2024

(51) Int. Cl.
*B62D 21/17* (2006.01)
*F01P 5/06* (2006.01)
*H02B 1/56* (2006.01)

(52) U.S. Cl.
CPC ............... *B62D 21/17* (2013.01); *F01P 5/06* (2013.01); *H02B 1/565* (2013.01)

(58) Field of Classification Search
CPC .............................. B62D 21/17; H01M 10/625
See application file for complete search history.

(56) References Cited

U.S. PATENT DOCUMENTS

| | | | |
|---|---|---|---|
| 5,490,572 A * | 2/1996 | Tajiri | B60L 1/02 180/68.5 |
| 9,661,783 B2 | 5/2017 | Sakuma et al. | |
| 9,795,067 B2 | 10/2017 | Takezawa et al. | |
| 9,832,909 B2 | 11/2017 | Tanaka et al. | |
| 10,231,363 B2 | 3/2019 | Kim et al. | |
| 2021/0184286 A1* | 6/2021 | Evans | B62D 21/09 |
| 2021/0300145 A1* | 9/2021 | Morrow | B60H 1/00271 |
| 2021/0378153 A1 | 12/2021 | Zheng et al. | |

FOREIGN PATENT DOCUMENTS

| | | |
|---|---|---|
| RU | 163449 U1 | 7/2016 |
| WO | 2013136810 A1 | 9/2013 |

\* cited by examiner

*Primary Examiner* — Eric S Ruppert
(74) *Attorney, Agent, or Firm* — Jeff A. Greene

(57) ABSTRACT

A cooling system, for circulating air through an electrical system for a work machine, includes an electrical cabinet, a chassis of the wok machine, and a blower fluidly connected to the electrical cabinet and the chassis. The electrical cabinet defines an interior volume for accommodating a plurality of electrical components of the electrical system. The chassis defines a closed-loop passageway configured to receive air from the interior volume of the electrical cabinet. The blower circulates the air through the interior volume of the electrical cabinet and the closed-loop passageway of the chassis.

20 Claims, 4 Drawing Sheets

COOLING SYSTEM FOR ELECTRICAL SYSTEMS FOR WORK MACHINES

TECHNICAL FIELD

The present disclosure relates to a cooling system for an electrical cabinet. More particularly, the present disclosure relates to an arrangement and method of circulating air in an electrical cabinet to maintain a temperature of the electrical cabinet.

BACKGROUND

Large off-highway machines, generally include multiple electrically powered devices for serving various electrical applications of the machines. For example, the devices may include power converters which modify and distribute electrical power to an electrical load, such as to wheels, of the machines. These power devices are generally housed within an electrical cabinet of the machines so that they can be protected from elements of an external environment, e.g., debris, dirt, dust, and moisture. In operation, the power devices may release heat which may result in an increase in a temperature within an interior volume of the electrical cabinet.

U.S. Pat. No. 9,832,909 discloses an electronic equipment cooling device. The electronic equipment cooling device includes a rectangular parallelepiped housing inside which heat-generating components are housed. Also, the electronic equipment cooling device includes a coolant supply device, i.e., a blower fan, that supplies a desired amount of air from the outside into the housing to cool surfaces of the housing.

SUMMARY OF THE INVENTION

In one aspect, the disclosure relates to a cooling system for circulating air through an electrical system for a work machine. The cooling system includes an electrical cabinet, a chassis of the wok machine, and a blower fluidly connected to the electrical cabinet and the chassis. The electrical cabinet defines an interior volume for accommodating a plurality of electrical components of the electrical system. The chassis defines a closed-loop passageway configured to receive air from the interior volume of the electrical cabinet. The blower circulates the air through the interior volume of the electrical cabinet and the closed-loop passageway of the chassis.

In another aspect, the disclosure is directed to an off-highway truck. The off-highway truck includes an electrical system and a cooling system. The electrical system includes a plurality of electrical components. The cooling system circulates air through the electrical system. The cooling system includes an electrical cabinet, a chassis of the wok machine, and a blower fluidly connected to the electrical cabinet and the chassis. The electrical cabinet defines an interior volume for accommodating a plurality of electrical components of the electrical system. The chassis defines a closed-loop passageway configured to receive air from the interior volume of the electrical cabinet. The blower circulates the air through the interior volume of the electrical cabinet and the closed-loop passageway of the chassis.

In yet another aspect, the disclosure is related to a method for circulating air through an electrical system of a work machine. The method includes providing an electrical cabinet to accommodate a plurality of electrical components of the electrical system. Also, the method includes fluidly sealing a chassis of the work machine with the electrical cabinet. The chassis defines a closed-loop passageway to receive air from an interior volume of the electrical cabinet. In addition, the method includes fluidly connecting a blower with each of the electrical cabinet and the chassis to circulate the air through the interior volume of the electrical cabinet and the closed-loop passageway of the chassis.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
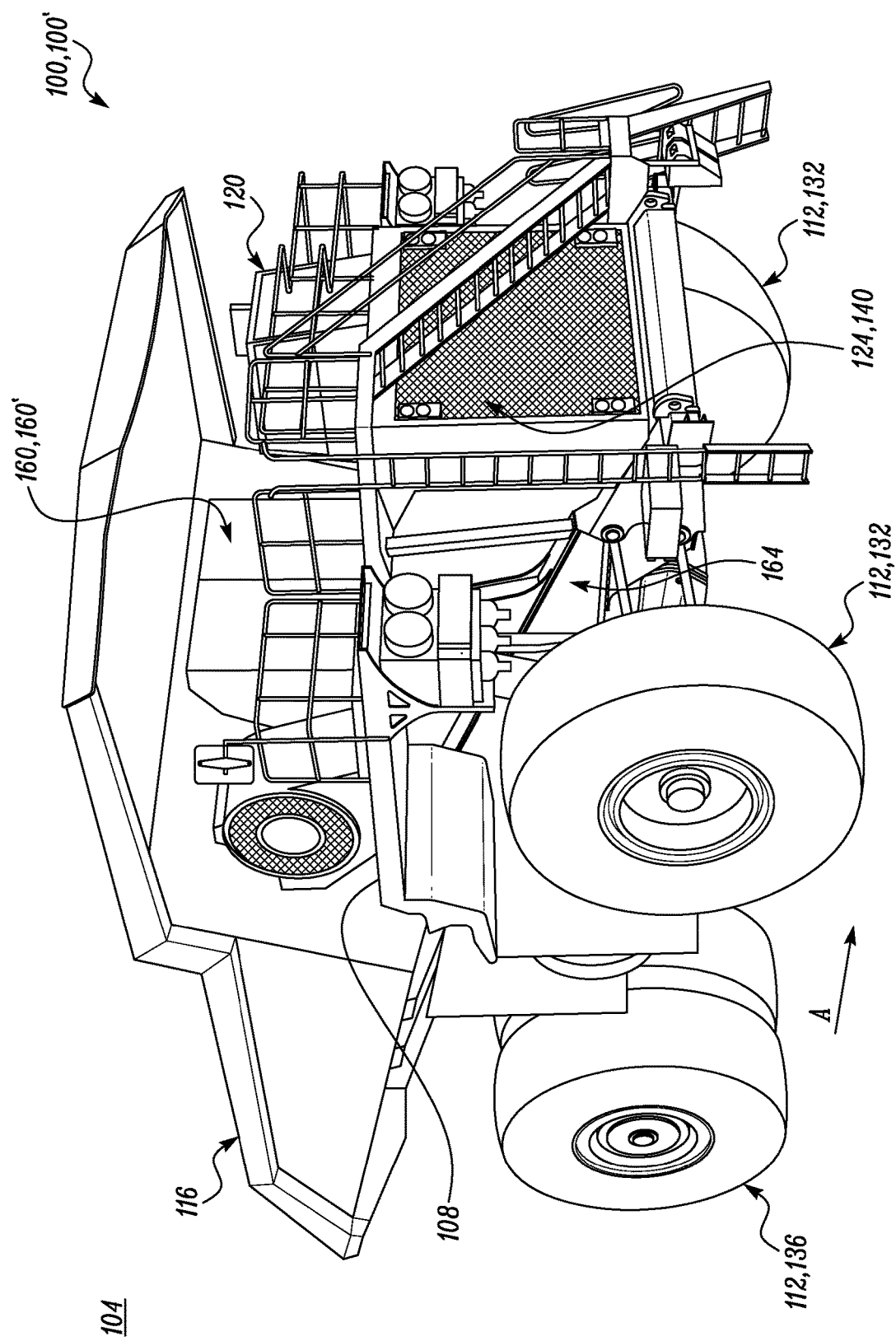
FIG. 1 illustrates an exemplary work machine having an electrical system, in accordance with an embodiment of the present disclosure.

Referring to FIG. 1, an exemplary work machine 100 (hereinafter referred to as 'machine 100') is shown. The machine 100 may include an off-highway truck 100' that may traverse back and forth between various locations on a worksite 104. Such exemplary locations may include load locations from where the off-highway truck 100' may receive payload (e.g., ores, boulders, sand, dirt, gravel, etc., not shown), and dump locations up to where the off-highway truck 100' may traverse to so as to release and dump the payload. In an exemplary operation, the off-highway truck 100' may receive the payload from a dump location of the worksite 104, traverse in a forward direction (indicated by an arrow 'A') from a load location toward a dump location of the worksite 104, release and dump the payload at the dump location, and traverse back toward the load location. Examples of the worksite 104 may include a mine site, an underground mine site, a construction site, a landfill, a quarry, etc.

Although references to the off-highway truck 100' are used, aspects of the present disclosure may also be applicable to other large work machines, such as underground dump trucks, haul trucks, loaders, etc., and references to the off-highway truck 100' in the present disclosure is to be viewed as purely exemplary.

Figure 3:
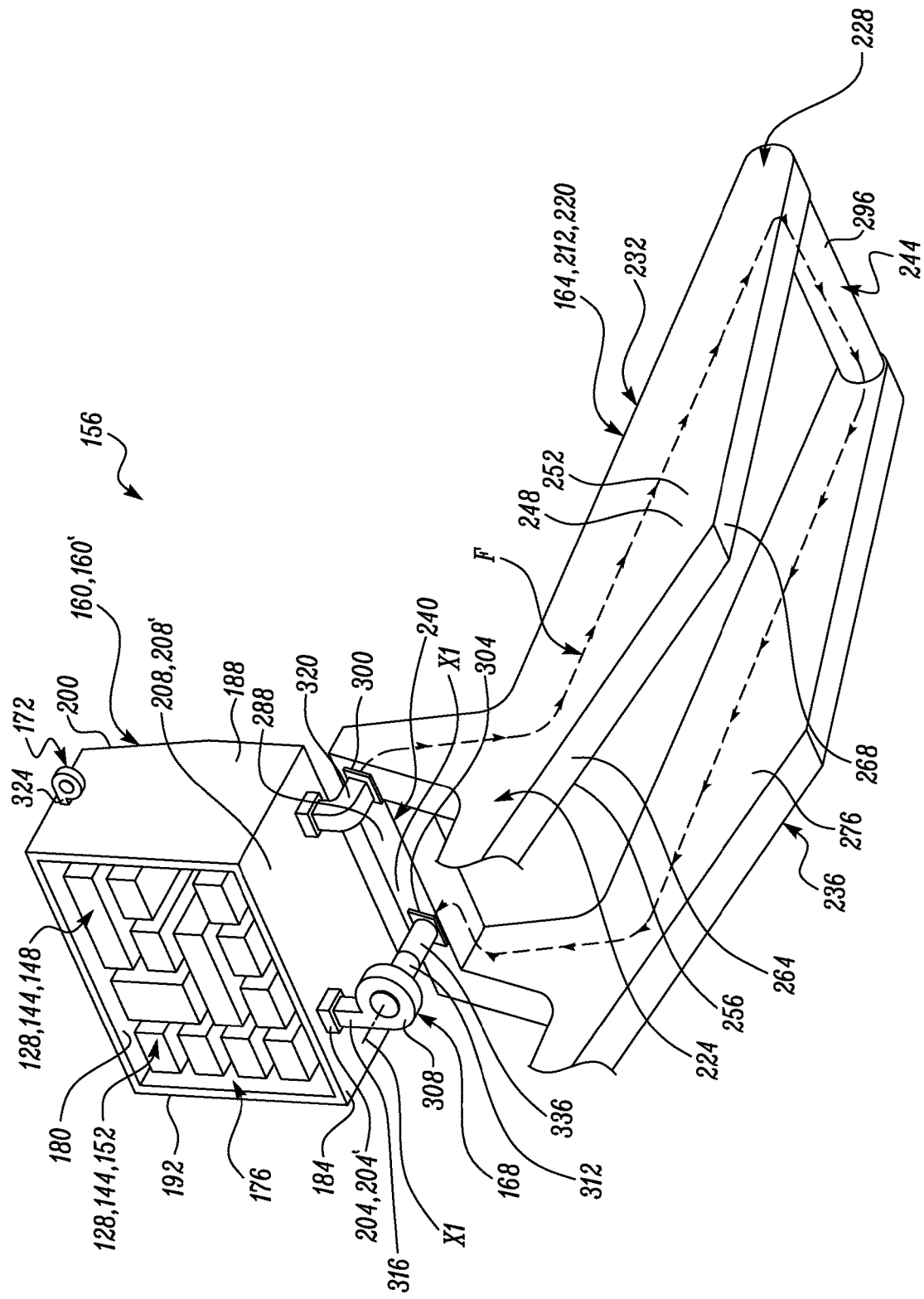
FIG. 3 is a schematic diagram of the cooling system, in accordance with an embodiment of the present disclosure.

The off-highway truck 100' (or the machine 100) includes a platform 108, one or more traction assemblies 112, a dump body 116, an operator cabin 120, a propulsion system 124, and an electrical system 128 (see FIG. 3). The platform 108 may accommodate and/or support the operator cabin 120 and the electrical system 128, although other known components and structures may be supported by the platform 108, as well. The traction assemblies 112 may support the off-highway truck 100' on ground at the worksite 104. The traction assemblies 112 may support the off-highway truck 100' in a loaded, partially loaded, and empty condition, so that a desired amount of traction and/or cushioning is provided, regardless of the payload present on the off-highway truck 100'. The traction assemblies 112 may include a set of front wheels 132 and a set of rear wheels 136. In some embodiments, the traction assemblies 112 may include crawler tracks (not shown) provided either alone or in combination with the wheels 132, 136.

The operator cabin 120 may be supported over the platform 108. The operator cabin 120 may facilitate stationing of one or more operators therein, to monitor the operations of the off-highway truck 100' (or the machine 100). Also, the operator cabin 120 may house various components and controls of the off-highway truck 100' (or the machine 100), access to one or more of which may help the operators to control the truck's movement and/or operation. For example, the various components and controls of the off-highway truck 100' may include one or more steering wheels, braking pedals, accelerating pedals, joysticks, switches etc., to facilitate an operator in operating the off-highway truck 100' and the dump body 116.

The propulsion system 124 may include a power compartment 140 and a power source (not shown) provided within the power compartment 140. The power source may include a combustion engine and an electrical power source operationally connected to the combustion engine. The electrical power source may be an electrical generator configured to be driven by the combustion engine to generate electrical power (e.g., alternating electrical current) required for operating various systems or assemblies, such as the traction assemblies 112 of the off-highway truck 100'. In other embodiments, the electrical power source may include energy storing units, such as batteries, for supplying power to various systems or assemblies of the off-highway truck 100".

The electrical system 128 may be electrically coupled to the propulsion system 124 to receive electrical power (e.g., alternating electrical current) from the power source. The electrical system 128 may be configured to output a modified (or modulated) electrical power to be supplied to the systems or assemblies, for example, to one or more electric drive motors (not shown) connected to the traction assemblies 112 for propelling or retarding the off-highway truck 100' (or the machine 100).

The electrical system 128 includes a plurality of electrical components 144. In an exemplary embodiment, as shown in FIG. 3, the electrical components 144 includes rectifiers 148 and inverters 152. The rectifiers 148 may be electrically coupled to the power source (e.g., electrical generator) to receive alternating electrical current from the power source (or the electrical generator). The rectifiers 148 may be configured to convert the alternating electrical current into a direct electrical current. The inverters 152 may be electrically coupled to the rectifiers 148 to receive the direct electrical current from the rectifiers 148. The inverters 152 may be configured to convert the direct electrical current into an alternating electrical current (of variable frequencies) used to power electric drive motors (not shown) connected to the traction assemblies 112.

It should be noted that the electrical components 144 may also include other power electronic devices, or components, or circuits, such as retarders, resistor grids, switches, communication buses, controllers, and the like. However, such other power electronic devices are not discussed herein, for the sake of brevity.

In operation, the electrical components 144 (e.g., the rectifiers 148 and the inverters 152) may generate heat that must be removed to avoid overheating and premature failure of the electrical components 144. To dissipate the heat generated by the electrical components 144 of the off-highway truck 100' (or the machine 100) and/or to maintain working temperature of the electrical system 128 (or the electrical components 144), in one or more aspects of the present disclosure, a cooling system 156 is disclosed. The cooling system 156 includes an electrical cabinet 160, a chassis 164 of the off-highway truck 100' (or the machine 100), and a blower 168 (hereinafter referred to as "circulation blower 168"). In addition, the cooling system 156 may include a pressurization blower 172. Each of the electrical cabinet 160, the chassis 164, the circulation blower 168, and the pressurization blower 172 is now discussed.

The electrical cabinet 160 accommodates the electrical components 144 (e.g., the rectifiers 148 and the inverters 152) in a manner to isolate and/or protect the electrical components 144 from outside environmental factors, such as moisture, dust, and the like. By way of non-limiting example, the electrical cabinet 160 may be embodied as a substantially cuboid shaped structure 160' supported on the platform 108 of the off-highway truck 100' and, positioned adjacent the operator cabin 120 (as shown in FIG. 2).

The electrical cabinet 160 defines an interior volume 176 for accommodating the electrical components 144. In an exemplary embodiment, as shown in FIGS. 2 and 3, the electrical cabinet 160 defines a top plate 180, a bottom plate 184, a first side plate 188, a second side plate 192, a first face plate 196, and a second face plate 200. The top plate 180 and the bottom plate 184 are disposed parallel to and spaced apart from each other. Each of the first side plate 188 and the second side plate 192 are disposed substantially perpendicular to the top plate 180 and the bottom plate 184. Also, the first side plate 188 and the second side plate 192 are disposed substantially parallel to and spaced apart from each other. Each of the first face plate 196 and the second face plate 200 are disposed substantially perpendicular to the top plate 180, the bottom plate 184, the first side plate 188, and the second side plate 192. In addition, the first face plate 196 and the second face plate 200 are disposed substantially parallel to and spaced apart from each other. The top plate 180, the bottom plate 184, the first side plate 188, the second side plate 192, the first face plate 196, and the second face plate 200 are coupled (e.g., welded) to each other to define the interior volume 176 of the electrical cabinet 160.

The electrical cabinet 160 is provided with an inlet 204 and an outlet 208 (see FIG. 3). The inlet 204 may define a passage 204' for the air to enter the interior volume 176 of the electrical cabinet 160. As shown in FIG. 3, the inlet 204 is defined at the bottom plate 184 of the electrical cabinet 160. However, it should be noted that the inlet 204 may be defined at any suitable location on the electrical cabinet 160. Similarly, the outlet 208 may define a passage 208' for the air to exit from the interior volume 176 of the electrical cabinet 160. As shown in FIG. 3, the outlet 208 is defined at the bottom plate 184 of the electrical cabinet 160 and adjacent to the inlet 204. However, it should be noted that the outlet 208 may be defined at any suitable location on the electrical cabinet 160.

Figure 2:
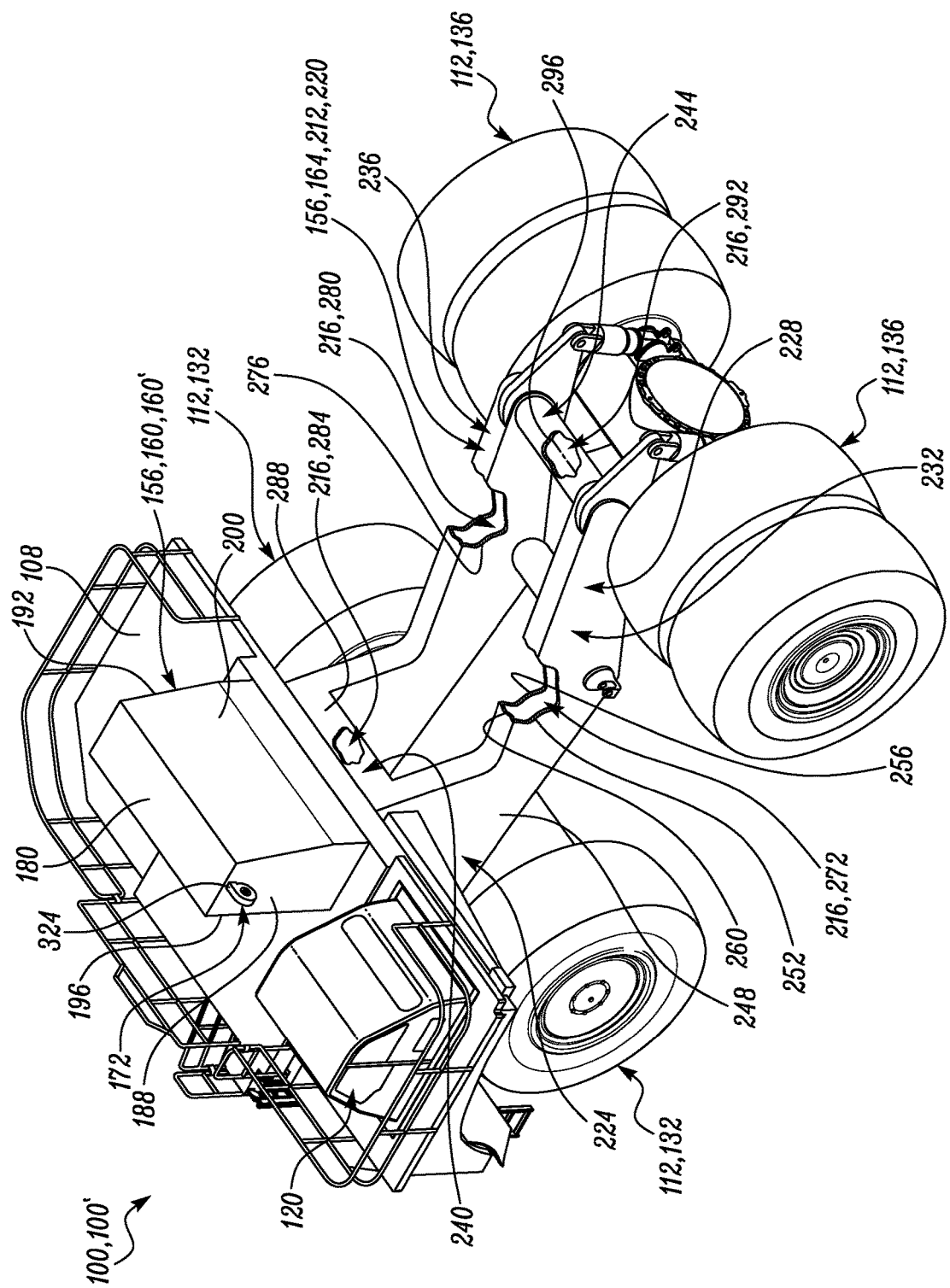
FIG. 2 illustrates the exemplary work machine devoid of a dump body thereof to show a cooling system for circulating air through the electrical system, in accordance with an embodiment of the present disclosure.

Referring to FIGS. 2 and 3, the chassis 164 is discussed. The chassis 164 includes a main-frame arrangement 212 and a closed-loop passageway 216. The main-frame arrangement 212 may include a ladder-frame structure 220. The ladder-frame structure 220 defines a front ladder-frame portion 224 and a rear ladder-frame portion 228. The front ladder-frame portion 224 may accommodate and/or support the platform 108 and the propulsion system 124, although other known components and structures may be supported by the front ladder-frame portion 224, as well. The rear ladder-frame portion 228 may support the dump body 116 of the off-highway truck 100' (or the machine 100).

The ladder-frame structure 220 may include two hollow longitudinal beams, namely a first hollow longitudinal beam 232 and a second hollow longitudinal beam 236. In addition, the ladder-frame structure 220 may include two hollow crossbeams, namely a first hollow crossbeam 240 and a second hollow crossbeam 244. It should be noted that the term "hollow longitudinal beam" or "hollow crossbeam" may refer to a beam structure having one or more wall portions surrounding an interior cavity. For example, the letter "O" resembles a hollow structure that defines a circular wall surrounding an interior cavity.

The ladder-frame structure 220 (or the main-frame arrangement 212) may define wall portions. For example, as shown in FIGS. 2 and 3, the first hollow longitudinal beam 232 includes wall portions 248, namely a first sidewall portion 252, a second sidewall portion 256, a top wall portion 260, a first bottom wall portion 264, and a second bottom wall portion 268. The first sidewall portion 252 and the second sidewall portion 256 are disposed parallel to and spaced apart from each other. The top wall portion 260 may be disposed at an angle with respect to the first sidewall portion 252 and the second sidewall portion 256. In the present embodiment, the top wall portion 260 is disposed substantially perpendicular to the first sidewall portion 252 and the second sidewall portion 256. The first bottom wall portion 264 and the second bottom wall portion 268 are disposed spaced apart from the top wall portion 260. In addition, the first bottom wall portion 264 and the second bottom wall portion 268 may be disposed at an angle with respect to the first sidewall portion 252 and the second sidewall portion 256. The first sidewall portion 252, the second sidewall portion 256, the top wall portion 260, the first bottom wall portion 264, and the second bottom wall portion 268 may be coupled (e.g., welded) to each other to define a first interior cavity 272 (see FIG. 2).

The second hollow longitudinal beam 236 is similar to the first hollow longitudinal beam 232 in construction and configuration. That is, the second hollow longitudinal beam 236 defines wall portions 276 (similar to the wall portions 248 of the first hollow longitudinal beam 232) coupled (e.g., welded) to each other to define a second interior cavity 280. The second hollow longitudinal beam 236 is disposed parallel to and spaced apart from the first hollow longitudinal beam 232.

The first hollow crossbeam 240 defines a third interior cavity 284 and wall portions 288 surrounding the third interior cavity 284. The first hollow crossbeam 240 is disposed towards the front ladder-frame portion 224. The first hollow crossbeam 240 extends laterally between the first hollow longitudinal beam 232 and the second hollow longitudinal beam 236. The second hollow crossbeam 244 defines a fourth interior cavity 292 and wall portions 296 surrounding the fourth interior cavity 292. The second hollow crossbeam 244 is disposed spaced apart from the first hollow crossbeam 240 and, towards the rear ladder-frame portion 228. Similar to the first hollow crossbeam 240, the second hollow crossbeam 244 extends between the first hollow longitudinal beam 232 and the second hollow longitudinal beam 236.

The closed-loop passageway 216 may be defined by the wall portions (e.g., the wall portions 248, 276, 288, 296) of the main-frame arrangement 212. For example, as shown in FIGS. 2 and 3, the first interior cavity 272 (surrounded by the wall portions 248 of the first hollow longitudinal beam 232), the second interior cavity 280 (surrounded by the wall portions 276 of the second hollow longitudinal beam 236), the third interior cavity 284 (surrounded by the wall portions 288 of the first hollow crossbeam 240), and the fourth interior cavity 292 (surrounded by the wall portions 296 of the second hollow crossbeam 244) are fluidly coupled with each other to define the closed-loop passageway 216.

The closed-loop passageway 216 may define an inlet opening 300 and an outlet opening 304 for establishing a fluidly sealed connection between the chassis 164 and the electrical cabinet 160 (see FIG. 3). The inlet opening 300 may facilitate the closed-loop passageway 216 to receive the air exiting the outlet 208, for example, via a ductwork 320 connected to the outlet 208, of the electrical cabinet 160. The outlet opening 304 may facilitate the closed-loop passageway 216 to return the air towards the inlet 204 and into the interior volume 176 of the electrical cabinet 160. The inlet opening 300 and the outlet opening 304 are defined at the first hollow crossbeam 240. However, it should be noted that the inlet opening 300 and the outlet opening 304 may be defined at any suitable location on the chassis 164 (or the main-frame arrangement 212), such as at the first hollow longitudinal beam 232, or at the second hollow longitudinal beam 236, or at the second hollow crossbeam 244.

In the fluidly sealed connection between the chassis 164 (or main-frame arrangement 212) and the electrical cabinet 160, the closed-loop passageway 216 is configured to receive air (via the inlet opening 300) from the interior volume 176 of the electrical cabinet 160. The closed-loop passageway 216 receives the air from the interior volume 176 at a first temperature. Moreover, in the fluidly sealed connection between the chassis 164 (or main-frame arrangement 212) and the electrical cabinet 160, the closed-loop passageway 216 is configured to route the air through the chassis 164 (or the main-frame arrangement 212) such that the air dissipates heat through the wall portions 248, 276, 288, 296 to outside environment surrounding the chassis 164 (or the main-frame arrangement 212), and further configured to return the air (via the outlet opening 304) to the interior volume 176 at a second temperature lower than the first temperature. Accordingly, the closed-loop passageway 216 maintains the working temperature of the electrical cabinet 160 (or of the electrical components 144 enclosed within the electrical cabinet 160).

The circulation blower 168 is now discussed. The circulation blower 168 may include a blower housing 308 and an impeller (not shown) enclosed within the blower housing 308. The impeller may be configured to rotate about an axis 'X1' when powered, for example, by the propulsion system 124. The blower housing 308 may include an axially positioned inlet 312 and a radially positioned outlet 316. The axially positioned inlet 312 may facilitate the circulation blower 168 to draw air in a direction substantially parallel to the axis 'X1', whereas the radially positioned outlet 316 may facilitate the circulation blower 168 to deliver the air in a direction substantially perpendicular to the axis 'X1'. In other embodiments, the circulation blower 168 may be any other suitable airflow unit, such as a fan unit, known in the art.

The circulation blower 168 is fluidly connected to the electrical cabinet 160. For example, as shown in FIG. 3, the circulation blower 168 is disposed at the inlet 204 of the electrical cabinet 160 in a configuration in which the radially positioned outlet 316 of the circulation blower 168 is fluidly connected with the inlet 204 of the electrical cabinet 160. Further, the circulation blower 168 is fluidly connected to the chassis 164 (or the main-frame arrangement 212). For example, as shown in FIG. 3, the axially positioned inlet 312 of the circulation blower 168 is fluidly connected with the outlet opening 304 of the closed-loop passageway 216 (of the chassis 164), via a ductwork 336.

The circulation blower 168 is configured to circulate the air through the interior volume 176 of the electrical cabinet 160 and the closed-loop passageway 216 of the chassis 164. For example, the circulation blower 168 draws the air (via the axial positioned inlet 312) flowing through the closed-loop passageway 216, pressurizes the drawn air, and directs the pressurized air (via the radially positioned outlet 316) towards the inlet 204 and into the interior volume 176 of the electrical cabinet 160.

The pressurization blower 172 is now discussed. The pressurization blower 172 may be fluidly connected with the electrical cabinet 160. For example, as shown in FIG. 3, the pressurization blower 172 is disposed at the first side plate 188 of the electrical cabinet 160 in a configuration in which an outlet 324 of the pressurization blower 172 is fluidly connected with the interior volume 176 of the electrical cabinet 160. The pressurization blower 172 may be configured to maintain a positive pressure of air within the interior volume 176 of the electrical cabinet 160. The positive pressure of air may be equal to or above an atmospheric pressure of the outside environment surrounding the electrical cabinet 160. For example, the pressurization blower 172 draws the air from the outside environment surrounding the electrical cabinet 160, pressurizes the drawn air, and supplies the pressurized air, via the outlet 324, into the interior volume 176 such that the positive pressure of air within the interior volume 176 is maintained equal to or above the atmospheric pressure. This may limit or restrict debris (or dust, or vapor) ingression within the electrical cabinet 160.

In some embodiments, operating speeds of the circulation blower 168 may be controlled based on desired cooling requirements, for example, to achieve a desired working temperature of the electrical cabinet 160. In an example, the circulation blower 168 may be controlled to operate at high rotational speeds to maintain the working temperature of the electrical cabinet 160 during high loading conditions, whereas the circulation blower 168 may be controlled to operate at relatively lower rotational speeds to maintain the working temperature of the electrical cabinet 160 during relatively low loading conditions.

INDUSTRIAL APPLICABILITY

Figure 4:
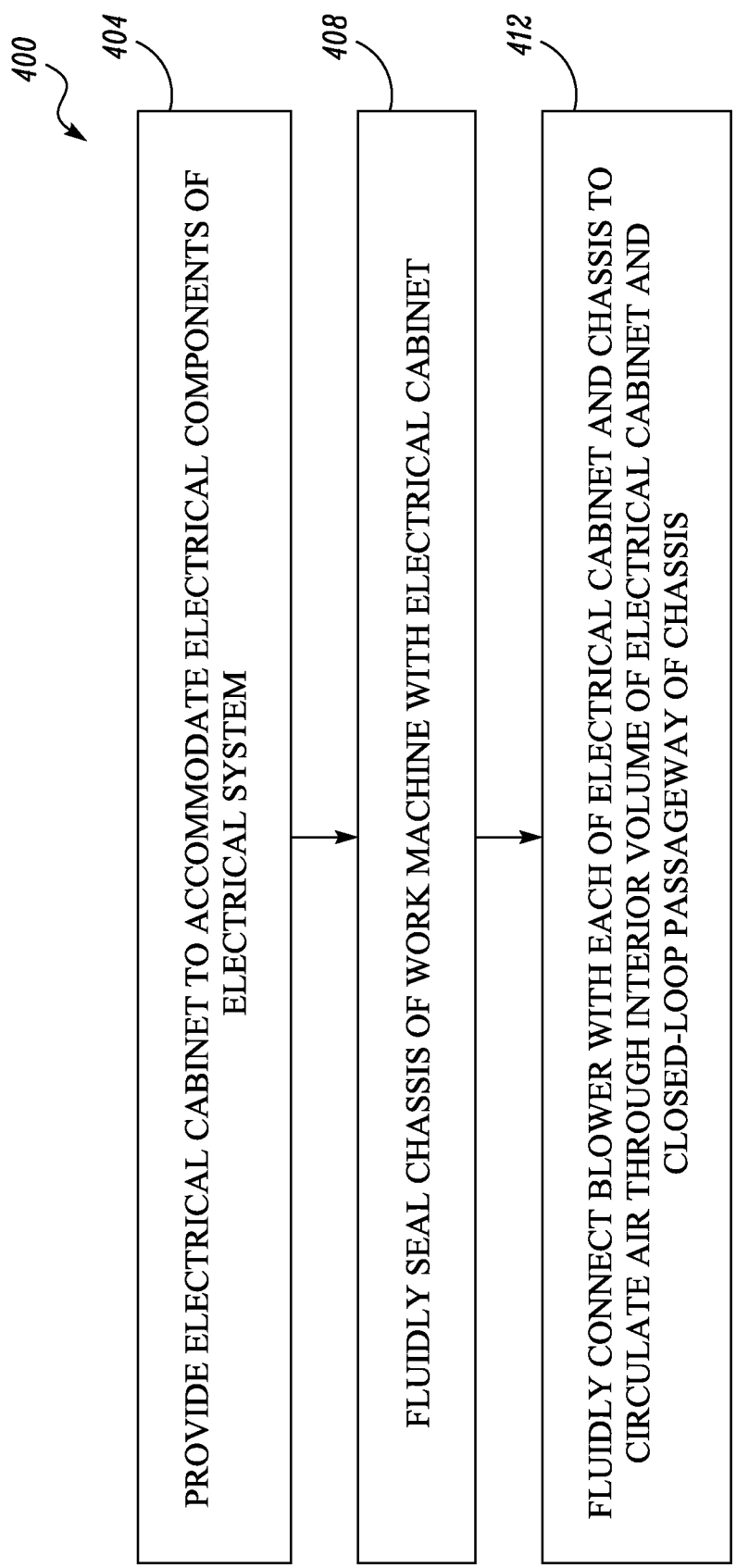
FIG. 4 depicts a flowchart illustrating a method for circulating air through the electrical system of the work machine, in accordance with an embodiment of the present disclosure.

Referring to FIG. 4, an exemplary method for circulating air through the electrical system 128 of the off-highway truck 100' (or the machine 100), utilizing the cooling system 156, is discussed. The method is discussed by way of a flowchart 400 that illustrates exemplary steps (i.e., from 404 to 412) associated with the method. The method is also discussed in conjunction with FIGS. 1-3.

Work machines, such as the machine 100 (or the off-highway truck 100'), are equipped with systems, such as electrical system 128 for propelling or retarding the machine 100 (or the off-highway truck 100'). Such systems typically include components or devices that generate heat when operated, for example, the electrical components 144 such as rectifiers 148, inverters 152, and the like. In operation, the heat generated by the electrical components 144 should be dissipated (e.g., to the outside environment) to avoid any overheating and/or premature failure situations. In addition, the electrical components 144 should be protected and/or isolated from the outside environmental factors, such as dirt, debris, moisture, and the like. In this regard, the electrical cabinet 160 is provided on the machine 100 (or the off-highway truck 100') to accommodate the electrical components 144 of the electrical system 128 (STEP 404).

Further, the chassis 164 of the machine 100 (or the off-highway truck 100') is fluidly sealed with the electrical cabinet 160 (STEP 408). For example, the inlet opening 300 of the chassis 164 is fluidly sealed with the outlet 208 of the electrical cabinet 160, whereas the outlet opening 304 of the chassis 164 is fluidly sealed with the inlet 204 of the electrical cabinet 160. The chassis 164 is fluidly sealed with the electrical cabinet 160 to establish fluid communication between the closed-loop passageway 216 of the chassis 164 and the interior volume 176 of the electrical cabinet 160.

Furthermore, the circulation blower 168 is fluidly connected with each of the electrical cabinet 160 and the chassis 164 (STEP 412). For example, the radially positioned outlet 316 of the circulation blower 168 may be fluidly connected with the inlet 204 of the electrical cabinet 160 and the axially positioned inlet 312 of the circulation blower 168 may be fluidly connected with the outlet opening 304 of the closed-loop passageway 216 (of the chassis 164), via the ductwork 336.

In operation, the circulation blower 168 generates an airflow (as illustrated via a flowline 'F', in FIG. 3) between the interior volume 176 of the electrical cabinet 160 and the closed-loop passageway 216 of the chassis 164. The airflow generated by the circulation blower 168 is from the interior volume 176 to the closed-loop passageway 216 and back from the closed-loop passageway 216 to the interior volume 176. For example, the circulation blower 168 is operated to draw the air (hot air present within the interior volume 176) out of the electrical cabinet 160 through the outlet 208. The air drawn out through the outlet 208 flows toward the inlet opening 300 of the closed-loop passageway 216 through the ductwork 320. The closed-loop passageway 216 receives the air at the first temperature (e.g., at 70 degree Celsius). The air received into the closed-loop passageway 216, via the inlet opening 300, successively flows through the first interior cavity 272, the fourth interior cavity 292, the second interior cavity 280, and the third interior cavity 284, to reach the outlet opening 304 of the closed loop passageway 216. As the air flows from the inlet opening 300 to the outlet opening 304, the air dissipates heat to the outside environment surrounding the chassis 164 through the wall portions 248, 276, 288, 296 (of the chassis 164) around the closed-loop passageway 216.

As the air reaches the outlet opening 304, the temperature of the air drops to the second temperature (e.g., to 50 degree Celsius) (due to heat dissipation). The air at the second temperature (i.e., cooled air) is drawn out of the closed-loop passageway 216 through the outlet opening 304 and returned back to the inlet 204 and into the interior volume 176 of the electrical cabinet 160, by the circulation blower 168. The cooled air returned into the interior volume 176 of the electrical cabinet 160 flows through and absorbs heat from the electrical components 144, thereby cooling the electrical components 144 and the electrical cabinet 160 enclosing the electrical components 144. The above-mentioned airflow cycle continues to maintain working temperatures of the electrical components 144 enclosed within the electrical cabinet 160.

In some embodiments, the pressurization blower 172 may be fluidly connected with the electrical cabinet 160 to maintain the positive pressure of air within the interior volume 176 equal to or above the atmospheric pressure of the outside environment surrounding the electrical cabinet 160.

The cooling system 156 may be applicable to any work machine (such as the off-highway truck 100'), particularly, large work machines provided with heat generating devices or systems (e.g., the rectifiers 148 and the inverters 152 enclosed within the electrical cabinet 160) and hollow chassis, such as the chassis 164. By routing the hot air (e.g., air at the first temperature) exiting the electrical cabinet 160 through the closed-loop passageway 216 of the chassis 164 thereby allowing the hot air to dissipate heat, and supplying the cooled air (e.g., air at the second temperature lower than the first temperature) from the closed-loop passageway 216 back to the electrical cabinet 160, the cooling system 156 may obviate (or eliminate) the need for additional cooling assemblies for maintaining working temperature of the electrical components 144. In this manner, the cooling system 156 may reduce the overall load requirement on the power sources of the machines, and hence provide a simple and cost-effective solution for cooling and/or maintaining working temperature of the heat generating devices or systems of the machines.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the cooling system and/or method of the present disclosure without departing from the scope of the disclosure. Other embodiments will be apparent to those skilled in the art from consideration of the specification and practice of the cooling system and/or method disclosed herein. It is intended that the specification and examples be considered as exemplary only, with a true scope of the disclosure being indicated by the following claims and their equivalent.

What is claimed is:

1. A cooling system for circulating air through an electrical system for a work machine, the cooling system comprising:
   an electrical cabinet defining an interior volume for accommodating a plurality of electrical components of the electrical system;
   a chassis of the work machine being fluidly sealed with the electrical cabinet, the chassis defining a closed-loop passageway configured to receive air from the interior volume of the electrical cabinet; and
   a blower fluidly connected to the electrical cabinet and the chassis, the blower circulates the air through the interior volume of the electrical cabinet and the closed-loop passageway of the chassis.

2. The cooling system of claim 1, wherein the closed-loop passageway is configured to receive the air from the interior volume at a first temperature, route the air through the chassis such that the air dissipates heat to an environment surrounding the chassis, and return the air to the interior volume at a second temperature lower than the first temperature such that a working temperature of the electrical cabinet is maintained.

3. The cooling system of claim 1, wherein the electrical cabinet defines an inlet, and wherein the blower is disposed at the inlet of the electrical cabinet.

4. The cooling system of claim 1 further including a pressurization blower configured to maintain a positive pressure of air within the interior volume of the electrical cabinet.

5. The cooling system of claim 4, wherein the positive pressure of air is equal to or above an atmospheric pressure.

6. The cooling system of claim 2, wherein the chassis includes a main-frame arrangement defining wall portions around the closed-loop passageway, and wherein the air dissipates heat to the environment through the wall portions.

7. The cooling system of claim 6, wherein the main-frame arrangement includes a ladder-frame structure configured to support a dump body of the work machine, the ladder-frame structure including:
   a first hollow longitudinal beam defining a first interior cavity;
   a second hollow longitudinal beam spaced apart from the first hollow longitudinal beam and defining a second interior cavity;
   a first hollow crossbeam extending between the first hollow longitudinal beam and the second hollow longitudinal beam and defining a third interior cavity; and
   a second hollow crossbeam extending between the first hollow longitudinal beam and the second hollow longitudinal beam and disposed spaced apart from the first hollow crossbeam, the second hollow crossbeam defining a fourth interior cavity, wherein:
   the first interior cavity, the second interior cavity, the third interior cavity, and the fourth interior cavity are fluidly coupled with each other to define the closed-loop passageway of the chassis, and
   the closed-loop passageway defines an inlet opening for receiving the air at the first temperature into the closed-loop passageway and an outlet opening for returning the air at the second temperature to the interior volume of the electrical cabinet from the closed-loop passageway.

8. An off-highway truck, comprising:
   an electrical system including a plurality of electrical components;
   a cooling system for circulating air through the electrical system, the cooling system including:
   an electrical cabinet defining an interior volume for accommodating the plurality of electrical components;
   a chassis of the off-highway truck being fluidly sealed with the electrical cabinet, the chassis defining a closed-loop passageway configured to receive air from the interior volume of the electrical cabinet; and
   a blower fluidly connected to the electrical cabinet and the chassis, the blower circulates the air through the interior volume of the electrical cabinet and the closed-loop passageway of the chassis.

9. The off-highway truck of claim 8, wherein the closed-loop passageway is configured to receive the air from the interior volume at a first temperature, route the air through the chassis such that the air dissipates heat to an environment surrounding the chassis, and return the air to the interior volume at a second temperature lower than the first temperature such that a working temperature of the electrical cabinet is maintained.

10. The off-highway truck of claim 8, wherein the electrical cabinet defines an inlet, and wherein the blower is disposed at the inlet of the electrical cabinet.

11. The off-highway truck of claim 8, wherein the cooling system includes a pressurization blower configured to maintain a positive pressure of air within the interior volume of the electrical cabinet, and wherein the positive pressure of air is equal to or above an atmospheric pressure.

12. The off-highway truck of claim 9, wherein the chassis includes a main-frame arrangement defining wall portions around the closed-loop passageway, and wherein the air dissipates heat to the environment through the wall portions.

13. The off-highway truck of claim 12, wherein the main-frame arrangement includes a ladder-frame structure configured to support a dump body of the off-highway truck, the ladder-frame structure including:
a first hollow longitudinal beam defining a first interior cavity;
a second hollow longitudinal beam spaced apart from the first hollow longitudinal beam and defining a second interior cavity;
a first hollow crossbeam extending between the first hollow longitudinal beam and the second hollow longitudinal beam and defining a third interior cavity; and
a second hollow crossbeam extending between the first hollow longitudinal beam and the second hollow longitudinal beam and disposed spaced apart from the first hollow crossbeam, the second hollow crossbeam defining a fourth interior cavity,
wherein the first interior cavity, the second interior cavity, the third interior cavity, and the fourth interior cavity are fluidly coupled with each other to define the closed-loop passageway of the chassis.

14. The off-highway truck of claim 13, wherein the closed-loop passageway defines an inlet opening for receiving the air at the first temperature into the closed-loop passageway and an outlet opening for returning the air at the second temperature to the interior volume of the electrical cabinet from the closed-loop passageway.

15. A method for circulating air through an electrical system of a work machine, the method comprising:
providing an electrical cabinet to accommodate a plurality of electrical components of the electrical system;
fluidly sealing a chassis of the work machine with the electrical cabinet, the chassis defining a closed-loop passageway to receive air from an interior volume of the electrical cabinet; and
fluidly connecting a blower with each of the electrical cabinet and the chassis to circulate the air through the interior volume of the electrical cabinet and the closed-loop passageway of the chassis.

16. The method of claim 15, wherein the closed-loop passageway is configured to receive the air from the interior volume at a first temperature, route the air through the chassis such that the air dissipates heat to an environment surrounding the chassis, and return the air to the interior volume at a second temperature lower than the first temperature such that a working temperature of the electrical cabinet is maintained.

17. The method of claim 15, wherein the electrical cabinet defines an inlet, and wherein the blower is disposed at the inlet of the electrical cabinet.

18. The method of claim 15 further including fluidly connecting a pressurization blower with the electrical cabinet to maintain a positive pressure of air within the interior volume of the electrical cabinet, wherein the positive pressure of air is equal to or above an atmospheric pressure.

19. The method of claim 16, wherein the chassis includes a main-frame arrangement defining wall portions around the closed-loop passageway, and wherein the air dissipates heat to the environment through the wall portions.

20. The method of claim 19, wherein the main-frame arrangement includes a ladder-frame structure configured to support a dump body of the work machine, the ladder-frame structure including:
a first hollow longitudinal beam defining a first interior cavity;
a second hollow longitudinal beam spaced apart from the first hollow longitudinal beam and defining a second interior cavity;
a first hollow crossbeam extending between the first hollow longitudinal beam and the second hollow longitudinal beam and defining a third interior cavity; and
a second hollow crossbeam extending between the first hollow longitudinal beam and the second hollow longitudinal beam and disposed spaced apart from the first hollow crossbeam, the second hollow crossbeam defining a fourth interior cavity, wherein:
the first interior cavity, the second interior cavity, the third interior cavity, and the fourth interior cavity are fluidly coupled with each other to define the closed-loop passageway of the chassis, and
the closed-loop passageway defines an inlet opening for receiving the air at the first temperature into the closed-loop passageway and an outlet opening for returning the air at the second temperature to the interior volume of the electrical cabinet from the closed-loop passageway.

\* \* \* \* \*